April 20, 1926.
R. LA FRANCE
1,581,963
MEANS FOR DELIVERING CHARGES OF MOLTEN GLASS
Filed August 11, 1920　　2 Sheets-Sheet 1
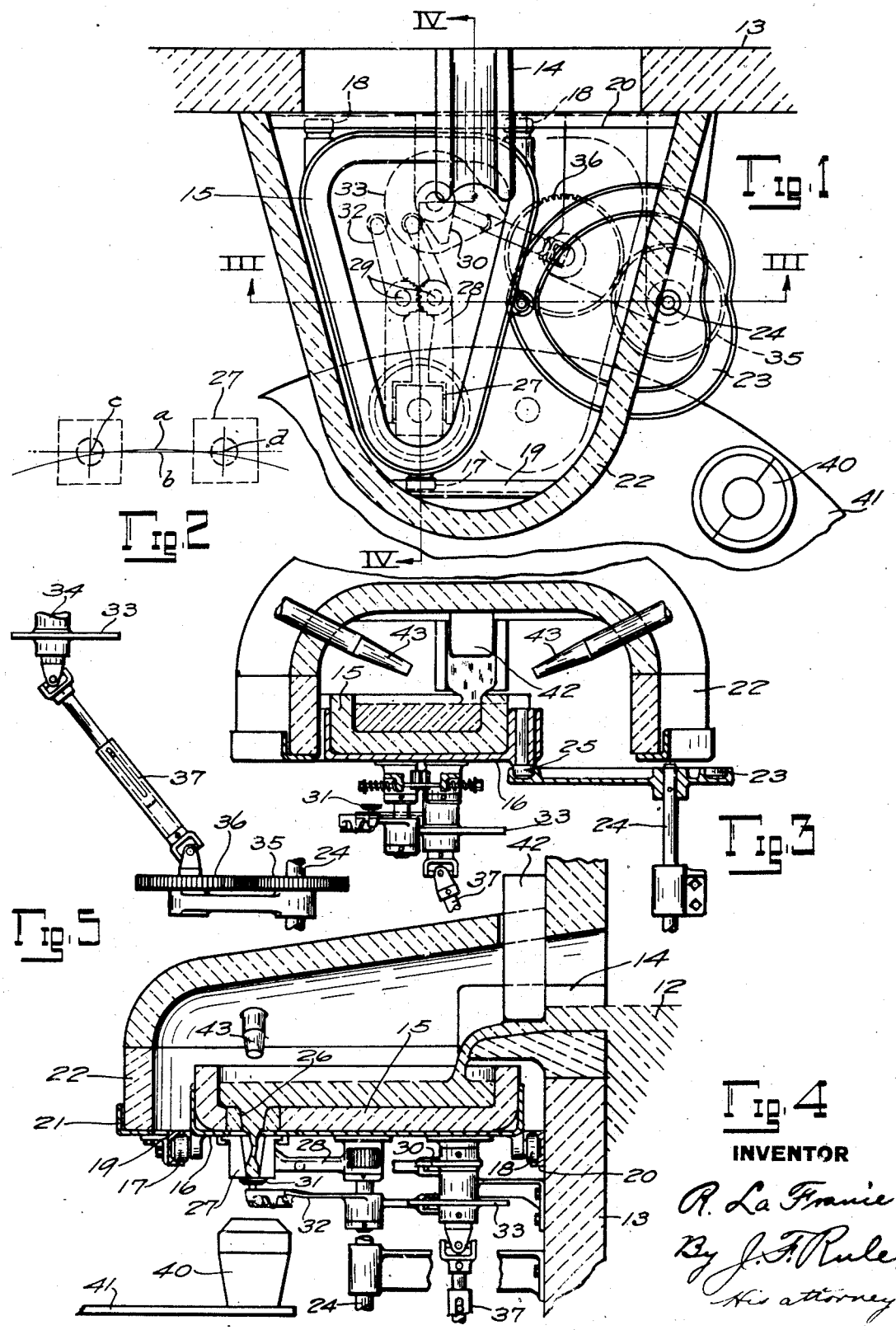
INVENTOR
R. La France
By J. F. Rule.
His attorney

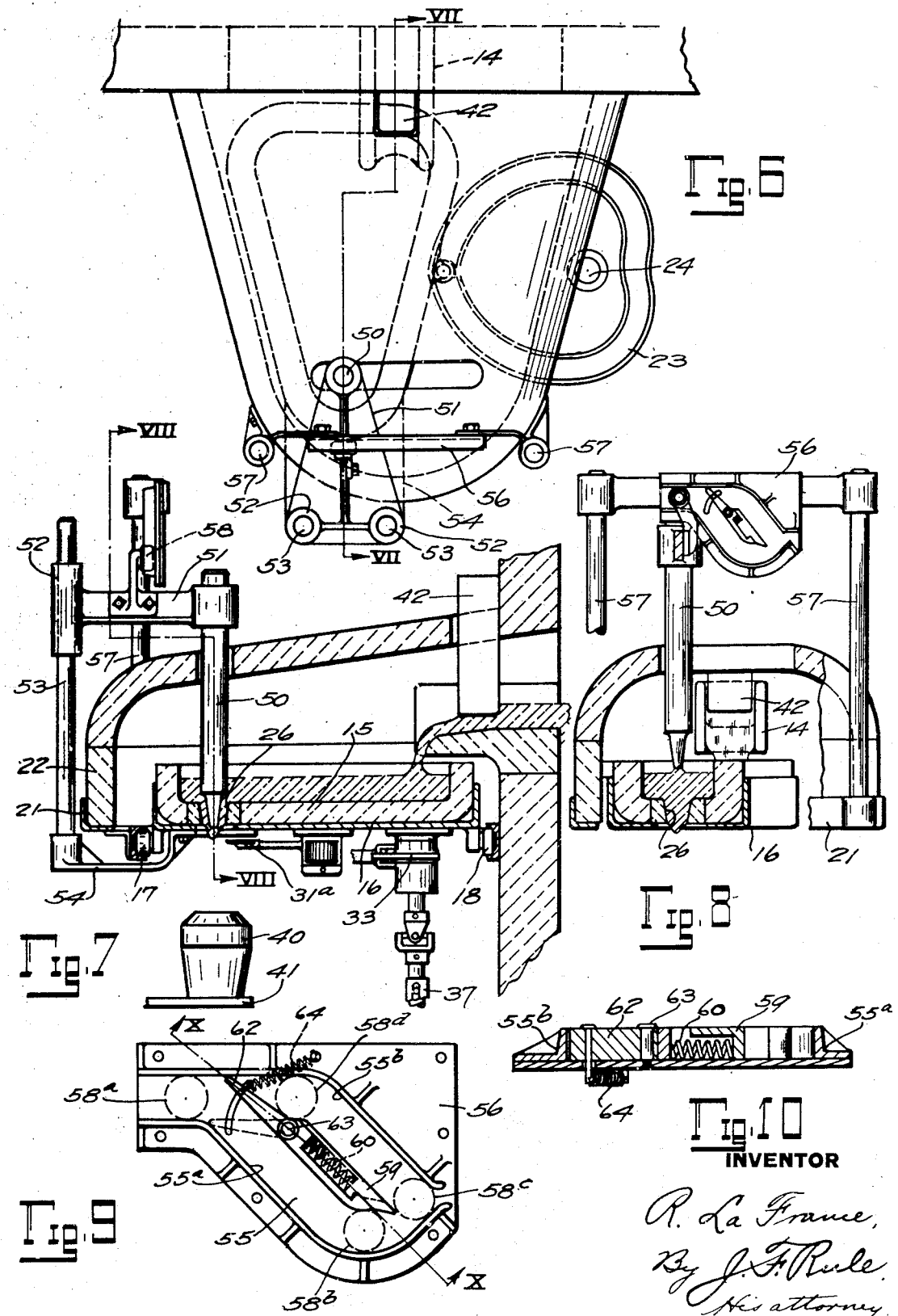

Patented Apr. 20, 1926.

1,581,963

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MEANS FOR DELIVERING CHARGES OF MOLTEN GLASS.

Application filed August 11, 1920. Serial No. 402,814.

*To all whom it may concern:*

Be it known that I, RICHARD LA FRANCE, a citizen of the United States, residing at Toledo, in the county of Lucas and State of Ohio, have invented new and useful Improvements in Means for Delivering Charges of Molten Glass, of which the following is a specification.

My invention relates to apparatus for forming and delivering charges of molten glass to the molds of a glass blowing or forming machine. An object of the invention is to provide an improved construction and arrangement particularly adapted for delivering the charges to the molds of a machine of the continuously rotating type. In carrying out my invention I provide in combination with the usual glass melting tank, an auxiliary receptacle located outside of the tank into which the glass may flow in a continuous stream. The receptacle is provided with an outlet through which the glass is discharged, and means are provided for controlling the discharge and forming the glass into individual masses or gobs which are dropped into or otherwise transferred to the molds. Mechanism is provided for reciprocating said receptacle in synchronism with the travel of the molds so that said receptacle and gob forming mechanism travel with each mold, permitting the gob to be delivered to the mold; and then return and advance with a succeeding mold.

Other features of the invention and the exact nature thereof will appear hereinafter.

Referring to the accompanying drawings:

Figure 1 is a sectional plan view of apparatus constructed in accordance with my invention.

Figure 2 is a diagrammatic view showing the paths of the molds and gob forming means.

Figure 3 is a sectional elevation at the line III—III on Figure 1.

Figure 4 is a section at the line IV—IV on Figure 1.

Figure 5 is a detail showing mechanism for transmitting motion to the gob forming apparatus.

Figures 6 to 10 illustrate a modified construction in which a vertically reciprocating plunger is employed to control the discharge of glass from the traveling receptacle. Figure 6 is a plan view of the apparatus. Figure 7 is a sectional elevation at the line VII—VII on Figure 6. Figure 8 is a section at the line VIII—VIII on Figure 7. Figure 9 is an elevation view of the cam track controlling the up and down movements of the plunger. Figure 10 is a section at the line X—X on Figure 9.

Referring particularly to Figures 1 to 5 inclusive, the molten glass 12 flows from a melting tank or furnace 13 through a spout 14 in the side wall of the tank into a receptacle 15 which is mounted to reciprocate horizontally. The body of the receptacle 15 may be made of fire clay or other refractory material and is supported on a metal frame 16 carrying front and rear rollers 17 and 18 which run on front and rear horizontal tracks 19 and 20 respectively, said tracks being supported on a stationary metal frame 21 which also forms a support for the clay boot or housing 22 which surrounds and covers the receptacle 15. The receptacle is reciprocated horizontally by means of a cam 23 on a continuously rotating vertical drive shaft 24, said cam being formed with a track on which runs a roll 25 connected to said receptacle.

The glass flows from the receptacle 15 through an outlet opening 26 in the bottom thereof into a sectional gob forming cup 27. This cup comprises horizontally separable sections carried on arms 28 mounted to swing about pivots 29, said arms being actuated by a cam 30. A disk cutter 31 carried on an arm 32 actuated by a cam 33, also forms a temporary closure for the lower end of the cup 27. The cams 30 and 33 are both mounted on a shaft 34 which, as shown in Figure 5, is driven from the shaft 24 through gears 35, 36 and an extensible shaft 37. The gob forming cup 27, cutter 31 and actuating mechanism for said parts may be of standard construction such as shown, for example, in the patent to Joseph B. Graham, No. 1,353,907, and patent to La France, No. 1,390,448 to which reference may be had for a detailed description.

The operation of the gob forming mechanism briefly is as follows: Each revolution of the drive shaft 24 imparts a revolution to the cam shaft 34 during which a cycle of operations takes place. As the glass commences to accumulate in the cup 27 it is temporarily supported by the cutter disk 31. The latter is then withdrawn by its cam and the glass continues to flow into the cup until enough for a mold charge is accumulated therein. The cam 30 then separates the cup sections, permitting the accumulated gob to drop into a mold 40. The cup sections then close immediately and the cutter disk 31 operates to sever the discharged gob from the oncoming glass which then accumulates to form the succeeding gob.

During the formation and discharge of a gob, the receptacle 15 is given a complete reciprocation by its cam 23. The molds 40 are mounted on a continuously rotating mold table 41. The receptacle 15 advances with each mold, the cup 27 being arranged to register with the mold and discharge its gob during such advance. By reference to Figure 2, it will be seen that the arc $a$ which represents the path of the mold axis is approximately in register with the straight line $b$ which represents the path of the gob cup 27, so that the gob if discharged at any time during the travel of said cup from position $c$ to position $d$ will discharge its gob directly into the mold. The line $b$ may be just outside the arc $a$ at the points $c$ and $d$ and just inside the arc at an intermediate point.

The flow of glass from the tank into the receptacle 15 may be regulated by a gate valve 42 adjustable up and down. The temperature of the glass within the boot 22 may be controlled by burners 43 which, as shown, are arranged to direct the heating flame against the glass directly over the outlet 26.

Figures 6 to 10 illustrate a modification in which the discharge of glass is controlled by a vertically reciprocating implement herein shown as a plunger or plug 50 arranged directly over the outlet 26. This plug or plunger is secured to a yoke 51 which is formed with sleeves 52 mounted to reciprocate on vertical standards 53 rising from a bracket 54 carried by the horizontally reciprocating frame 16. The vertical movements of the plunger are controlled by a cam track 55 formed on a stationary plate 56 supported on standards 57 rising from the supporting frame 21. A cam roll 58 carried by the yoke 51 runs on the cam track 55. As said roll travels from left to right (Fig. 9) from the starting position $58^a$, it runs on the lower section $55^a$ of the track, thereby causing the plunger 50 to descend until the roll reaches its lowest position $58^b$, and then to commence its upward movement, owing to the upward trend of the track. As the cam roll is completing its movement to the right it passes a switch 59 which is forced upwardly against the tension of a spring 60 by said roll and then snaps behind the roll which is now in the position $58^c$. During the return movement of the charger, that is, to the left, the cam roll moves upwardly along the track section $55^b$ so that the plug 50 is lifted and reaches its highest point when the cam roll reaches the position $58^d$. Said roll then moves horizontally to the starting position $58^a$, and during such movement forces downward a switch 62 about its pivot 63, which switch is thrown upward by a spring 64 after the cam roll has passed, thereby forcing said roll to travel along the lower cam track when it again moves to the right. The plug 50 as it moves downward, exerts an expelling force on the glass, tending to discharge the glass in the form of a lump or gob, which is severed by the cutter $31^a$ about the time the plunger reaches its lowest position. As the plunger moves upward it exerts a sustaining or lifting action on the glass and thereby retards or stops the flow and supports the glass during the return movement of the receptacle. The lifting action of the plunger on the glass may be sufficient to draw the glass upward above the outlet orifice.

Modifications may be resorted to within the spirit and scope of my invention.

What I claim is:

1. The combination with a melting furnace or tank, of a receptacle, means to reciprocate said receptacle horizontally, said receptacle having an outlet for the discharge of glass, automatic means to supply glass from the tank to said receptacle and maintain a continuous head of glass in the receptacle over said outlet, means reciprocating with said receptacle to periodically control said discharge and form the glass into individual masses, and a cutter operable to sever said masses from the glass in the receptacle.

2. The combination of a receptacle to contain molten glass, having a discharge outlet, means to reciprocate said receptacle horizontally, an implement extending into the glass over said outlet, and means to reciprocate said implement vertically in synchronism with the horizontal movements of the receptacle and thereby control the discharge of glass.

3. The combination of a receptacle to contain molten glass, having a discharge outlet, means to reciprocate said receptacle horizontally, an implement extending into the glass over said outlet, means to reciprocate said implement vertically in synchronism with the horizontal movements of the receptacle and thereby control the discharge of glass, and a cutter beneath said outlet operating in synchronism with the movements of said implement to sever individual masses or charges of glass.

4. The combination with a melting furnace or tank, of a receptacle, means to reciprocate said receptacle horizontally, said receptacle having an outlet for the discharge of glass, automatic means to supply glass from the tank to said receptacle and maintain a continuous head of glass in the receptacle over said outlet, and means reciprocating with said receptacle and operating periodically on the glass therein to periodically control said discharge and deliver formed charges of glass.

5. The combination with a tank to contain molten glass, a receptacle located externally of the tank, means for flowing glass from the tank into said receptacle, a continuously rotating mold carriage, molds thereon, means to reciprocate said receptacle, the latter having a discharge outlet above the molds and arranged to travel in register with each mold and then return and register with a succeeding mold, and forming means associated with and movable towards and away from said outlet to shape the issuing glass into formed masses, and means separate from and movable with respect to the forming means to sever the formed masses and deliver them to the molds.

6. The combination with a tank to contain molten glass, a receptacle located externally of the tank, means for flowing glass from the tank into said receptacle, a continuously rotating mold carriage, molds thereon, means to reciprocate said receptacle, the latter having a discharge outlet above the molds and arranged to travel in register with each mold and then return and register with a succeeding mold, a controlling and shaping device, said device and outlet having a relative movement toward and away from each other to control and shape the glass as it discharges through said outlet, and shearing means operating separately from the controlling and shaping means to sever and cause a formed charge of glass to be delivered to each mold as it travels in register with said outlet.

Signed at Toledo, in the county of Lucas and State of Ohio, this 9th day of August, 1920.

RICHARD LA FRANCE.